United States Patent [19]

Thompson

[11] Patent Number: 5,328,192
[45] Date of Patent: Jul. 12, 1994

[54] MANUAL PULL-TYPE CARRIER FOR TRANSPORTING A LARGE GAME CARCASS

[76] Inventor: John R. Thompson, Rte. 2, Box 214, Scammon, Kans. 66773

[21] Appl. No.: 33,487

[22] Filed: Mar. 18, 1993

[51] Int. Cl.⁵ ............................................. B62B 1/12
[52] U.S. Cl. .................................. 280/47.24; 280/8; 280/43.1; 280/47.315; 280/47.371
[58] Field of Search .................. 280/8, 43, 43.1, 47.18, 280/47.19, 47.24, 47.26, 47.315, 79.2, 79.6, 47.371, 652, 655, 655.1

[56] References Cited

U.S. PATENT DOCUMENTS

| | | |
|---|---|---|
| 454,174 | 6/1891 | Martin et al. ............... 280/47.31 X |
| 539,851 | 5/1895 | Bedford ........................... 280/47.24 |
| 696,535 | 4/1902 | Bailey ................................... 280/43 |
| 1,383,542 | 7/1921 | Hurd ................................ 280/43 X |
| 2,563,372 | 8/1951 | Risse ................................ 280/43 X |
| 2,613,953 | 10/1952 | Giovannoni . | |
| 2,918,299 | 12/1959 | Lambert ..................... 280/47.315 X |
| 3,073,614 | 1/1963 | Zinneman .................... 280/47.18 X |
| 3,222,100 | 12/1965 | Lindzy ......................... 280/47.24 X |
| 3,260,533 | 7/1966 | Ryder ............................. 280/43.1 |
| 3,580,592 | 5/1971 | Schrecengost . | |
| 3,877,723 | 4/1975 | Fahey et al. ................. 280/47.26 X |
| 4,045,040 | 8/1977 | Fails . | |
| 5,064,020 | 11/1991 | Eagleson . | |

FOREIGN PATENT DOCUMENTS

| | | | |
|---|---|---|---|
| 454931 | 3/1949 | Canada ..................................... 280/8 |
| 909535 | 4/1954 | Fed. Rep. of Germany .......................... 280/47.371 |
| 0219989 | 3/1985 | Fed. Rep. of Germany ... 280/47.18 |
| 621888 | 5/1927 | France ............................. 280/47.24 |
| 667589 | 10/1929 | France ............................. 280/47.24 |
| 1483760 | 6/1967 | France ............................ 280/47.371 |

*Primary Examiner*—Brian L. Johnson
*Attorney, Agent, or Firm*—John R. Flanagan

[57] ABSTRACT

A manually pull-type carrier includes a mobile carriage and a towing handle assembly slidably mounted to the carriage for changing the overall length of the carrier. The mobile carriage includes a pair of longitudinal rails rigidly interconnected and spaced laterally apart by a plurality of fore-and-aft spaced transverse bars, and a pair of wheels or skis with axle assemblies movably supporting the rails and being adjustable for changing the height of the rails above the ground. The towing handle assembly includes a pair of angle side braces and a front U-shaped handle telescopic with the angle side braces for adjusting the height of the handle to fit hunters of differing heights who tow the carriage.

11 Claims, 2 Drawing Sheets

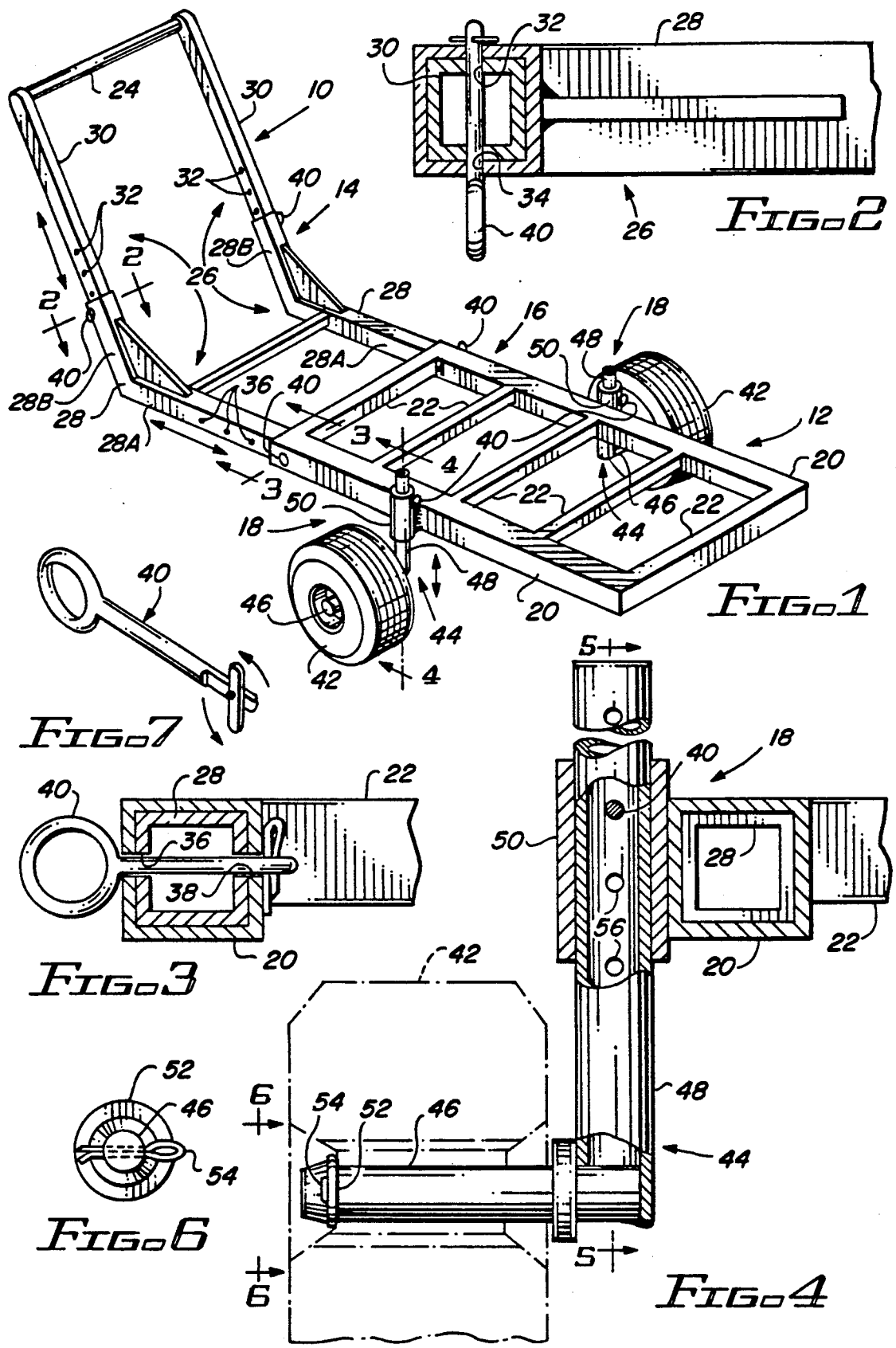

MANUAL PULL-TYPE CARRIER FOR TRANSPORTING A LARGE GAME CARCASS

BACKGROUND OF THE INVENTION

1. Field of the Invention

The present invention generally relates to a and, more particularly, is concerned with a manual pull-type carrier for transporting a large game carcass.

2. Description of the Prior Art

Hunters often hunt in remote locations that are not accessible by motorized vehicles, such as trucks and automobiles. As a consequence, the hunters must transport their hunting equipment and large game carcasses, such as deer, without the aid of their motorized vehicles.

Various kinds of devices are employed by hunters for transporting the large game carcasses from the location where they were killed back to camps and for transporting the carcasses and hunting equipment between the camps and motorized vehicles or other locations. Representative examples of these prior art devices are the ones disclosed in U.S. Pat. Nos. to Giovannoni (2,613,953), Schrecengost (3,580,592), Fails (4,045,040) and Eagleson (5,064,020). However, these prior art devices suffer from a common drawback, which is the failure of users to be able to adjust their components to accommodate differing conditions of terrain, size of the load, and size of the user.

Consequently, a need exists for a manual pull-type carrier which will overcome this common drawback of the prior art devices without introducing a new drawback in its place.

SUMMARY OF THE INVENTION

The present invention provides manual pull-type carrier designed to satisfy the aforementioned need. The carrier of the present invention has an elongated load-carrying bed and a pair of adjustable wheel or ski mounting assemblies for quickly and easily changing the height of the load-carrying bed above the ground to accommodate the differing conditions of mud, sand and rocky terrain. The carrier also has a towing handle assembly for quickly and easily changing the length and height of the towing handle relative to the load-carrying bed to fit the height and strength of different users.

Accordingly, the present invention is directed to a manual pull-type carrier which comprises: (a) a mobile carriage; and (b) an adjustable towing handle assembly including a handle and a structure interconnecting the handle to the mobile carriage for changing the length and height of the towing handle relative to the mobile carriage. The mobile carriage includes a load-carrying bed. The interconnecting structure of the handle assembly includes a pair of angled side braces slidably mounted to the front end of the load-carrying bed of the mobile carriage for changing the overall length of the carrier to support animal carcasses of different lengths thereon. Also, the interconnecting structure includes a pair of extension members rigidly supporting the front handle and telescopably supported by the angled side braces for changing the overall height of the handle to fit hunters of different heights towing the carriage.

Also, the present invention is directed to a manual pull-type carrier which comprises: (a) a mobile carriage including the elongated load-carrying bed and a pair of adjustable wheel mounting assemblies connected to opposite sides of the load-carrying bed for changing the height of the load-carrying bed above the ground; and (b) an adjustable towing handle assembly slidably mounted to the front end of the load-carrying bed for changing the overall length of the carrier to support animal carcasses of different lengths thereon. The load-carrying bed includes a pair of longitudinal rails rigidly interconnected and spaced laterally apart by a plurality of longitudinally spaced transverse bars. Each adjustable wheel mounting assembly includes a wheel and an axle assembly having a horizontal spindle rotatably mounting the wheel and a vertical support member rigidly attached to one end of the spindle and mounted for vertical sliding movement through a sleeve attached on a side of one of the longitudinal rails of the bed. Thus, the wheels of the wheel mounting assemblies movably support the rails of the load-carrying bed and the vertical support members of the axle assemblies are adjustable for changing the height of the rails above the ground.

Further, the present invention is directed to a manual pull-type carrier which comprises: (a) a carriage including the elongated load-carrying bed and a pair of adjustable ski mounting assemblies connected to opposite sides of the load-carrying bed for changing the height of the load-carrying bed above the ground and sliding the carriage across the ground; and (b) an adjustable towing handle assembly slidably mounted to the front end of the load-carrying bed for changing the overall length of the carrier to support animal carcasses of different lengths thereon. The load-carrying bed includes a pair of longitudinal rails rigidly interconnected and spaced laterally apart by a plurality of fore-and-aft spaced transverse bars. Each adjustable ski mounting assembly includes an elongated ski, a mounting bracket, and an axle assembly having a horizontal spindle pivotally mounting the ski via the mounting bracket and a vertical support member rigidly attached to one end of the spindle and mounted for vertical sliding movement through a sleeve attached on a side of one of the longitudinal rails of the bed. Thus, the skis of the ski mounting assemblies movably support the rails of the load-carrying bed, and the vertical support members of the axle assemblies are adjustable for changing the height of the rails above the ground.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a manual pull-type carrier of the present invention.

FIG. 2 is an enlarged fragmentary cross-sectional view of an adjustable towing handle assembly of the carrier taken along line 2—2 of FIG. 1.

FIG. 3 is an enlarged fragmentary cross-sectional view of the towing handle assembly and load-carrying bed of the carrier taken along line 3—3 of FIG. 1.

FIG. 4 is an enlarged end elevational view of an adjustable wheel mounting assembly of the carrier taken along line 4—4 of FIG. 1.

FIG. 6 is an enlarged end elevational view of a spindle and locking clip of the wheel and ski mounting assemblies as seen along line 6—6 of FIG. 4.

FIG. 7 is an enlarged perspective view of a self-locking pin of the wheel and ski mounting assemblies.

DETAILED DESCRIPTION OF THE INVENTION

Figure 8:
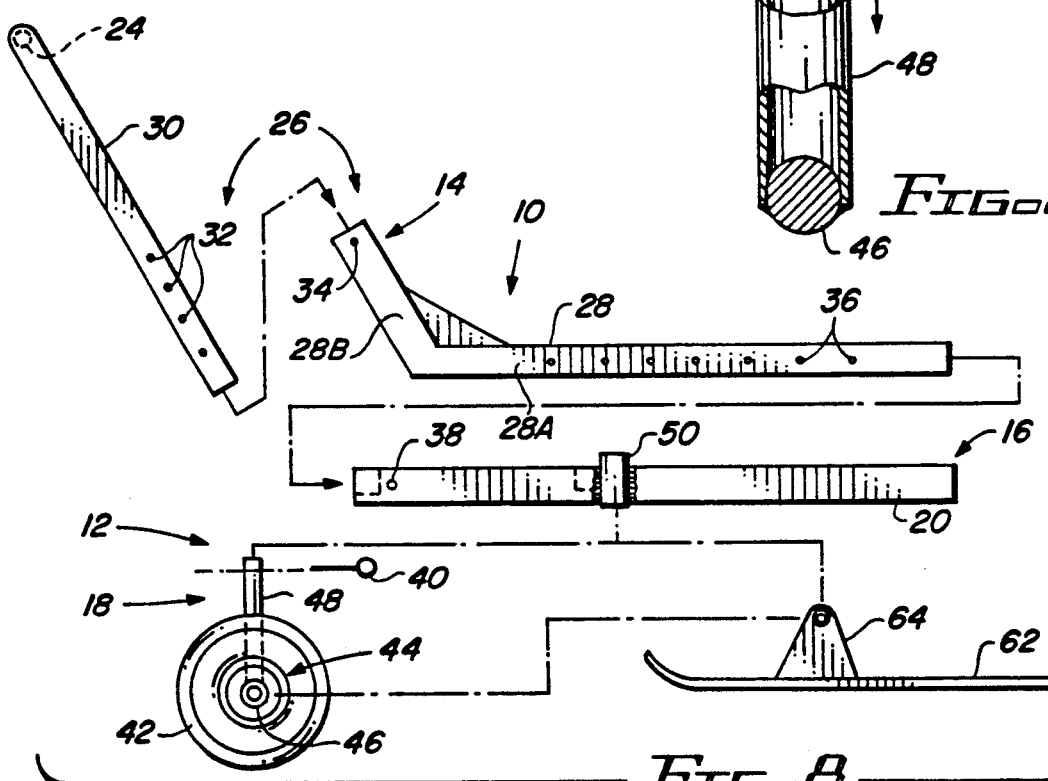
FIG. 8 is an exploded side elevational view of the carrier of the present invention showing the axle assembly adapted for mounting either a wheel or a ski.

Referring to the drawings and particularly to FIGS. 1 and 8, there is illustrated a manual pull-type carrier, generally designated 10, of the present invention. Basically, the manual pull-type carrier 10 includes a mobile carriage 12 and an adjustable towing handle assembly 14. The mobile carriage 12 includes a load-carrying bed 16 and a pair of adjustable wheel mounting assemblies 18. The load-carrying bed 16 includes a pair of longitudinal tubular rails 20 and a plurality of transverse reinforcement bars 22. The transverse bars 22 are shorter in length than the longitudinal rails 20 and are spaced longitudinally from one another and rigidly interconnect and extend between the rails 20 and space the rails 20 laterally apart from one another. In such arrangement, the load-carrying bed 16 has a generally rectangular configuration.

Referring to FIGS. 1—3 and 8, the adjustable towing handle assembly 14 of the carrier 12 includes a front transverse handle 24 and a structure 26 interconnecting the handle 24 to the mobile carriage 12. The towing handle assembly is adjustable for changing the length and height of the towing handle assembly 14 relative to the mobile carriage 12. The interconnecting structure 26 of the handle assembly 14 includes a pair of angled side braces 28 slidably mounted within the front ends of the longitudinal rails 20 of the load-carrying bed 16 of the mobile carriage 12 for changing the overall length of the carrier 12 to support animal carcasses of different lengths thereon. Also, the interconnecting structure 26 includes a pair of elongated extension members 30. At their front ends, the extension members 30 rigidly support the front transverse handle 24 therebetween. At their rear ends, the extension members 30 are telescopably supported within the front ends of the angled side braces 28 for changing the overall height of the front handle 24 to fit hunters of different heights towing the mobile carriage 12. The extension members 30, angled side braces 28, and front ends of the longitudinal rails 20 have respective pairs of holes 32, 34, 36 and 38 for alignment at different adjusted positions. Also, as shown in FIGS. 2 and 3, a plurality of self-locking pins 40 shown in FIG. 7 are releasably insertable through the aligned pairs of holes 32, 34, 36 and 38 for locking the towing handle assembly 14 at the adjusted positions relative to the load-carrying bed 16. Thus, each of the angled side braces 28 includes an elongated rear portion 28A and an elongated front portion 28B being shorter in length than the rear portion 28A. The front portion 28B of each angled side brace 28 is rigidly attached at a rear end to the forward end of the rear portion 28A thereof so as to extend at an angle forwardly and upwardly from the rear portion 28A. The rear portion 28A of each angled side brace 28 is telescopably slidably mounted to the front end of a corresponding one of the longitudinal rails 20 of the bed 16. The front portion 28B of each angled side brace 28 is telescopably slidably mounted to the rear end of a corresponding one of the extension members 30 of the front handle 24.

Referring to FIGS. 1 and 4-8, each adjustable wheel mounting assembly 18 is connected to opposite exterior sides of the longitudinal rails 20 of the load-carrying bed 16 and is operable for changing the height of the load-carrying bed 16 of the mobile carriage 12 above the ground. Each adjustable wheel mounting assembly 18 includes a tire or wheel 42 and an axle assembly 44 mounted equidistantly between front and rear opposite ends of the load-carrying bed 16. Preferably, the wheel 42 has a low profile being of a size used on riding lawnmowers. Such wheels 42 provide the mobile carrier 10 with an overall low profile making it easier for users to lift and place heavy carcasses on the bed 16. The axle assembly 44 has a horizontal spindle 46 rotatably mounting the wheel 42 and a vertical support member 48 rigidly attached at its lower end to an inner end of the spindle 46. The vertical support member 48 is mounted for vertical sliding movement through a sleeve 50 rigidly attached on a side of one of the longitudinal rails 20 of the bed 16. A washer 52 and removable clip 54 are installed on the outer end of the spindle 46 to removably retain the wheel 42 thereon. Pairs of spaced holes 56 provided through the vertical support member 48 are selectively alignable with a pair of holes 58 through the sleeve 50 and can receive one of the self-locking pins 40 for retaining the vertical support member 48 at a desired position along the sleeve 50. Thus, the wheels 42 of the wheel mounting assemblies 18 movably support the load-carrying bed 26 while the vertical support members 48 of the axle assemblies 44 are adjustable for changing the height of the bed 26 above the ground.

Figure 9:
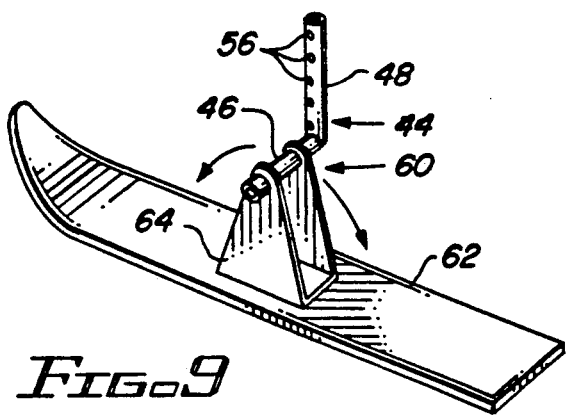
FIG. 9 is an enlarged perspective view of one of the ski mounting assemblies of the carrier.
Figure 5:
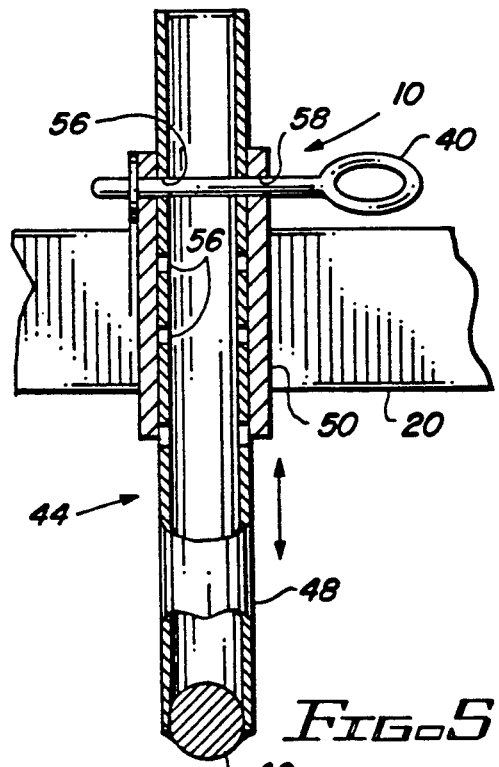
FIG. 5 is a longitudinal sectional view of the wheel mounting assembly taken along line 5—5 of FIG. 4.

Referring to FIGS. 8 and 9, alternatively the manual pull-type carrier 10 can employ a pair of adjustable ski mounting assemblies 60 connected to the opposite sides of the load-carrying bed 26 for changing the height of the load-carrying bed 26 above the ground and for sliding (as opposed to rolling) the mobile carriage 12 across the ground. Each adjustable ski mounting assembly 60 includes an elongated snow ski 62, a mounting bracket 64, and the above-described axle assembly 44. The horizontal spindle 46 pivotally mounts the ski 62 via the mounting bracket 60. The vertical support member 48 rigidly attached to the one end of the spindle 46 is mounted for vertical sliding movement through the sleeve 50 on the one rail 20, in the manner described above. Thus, the skis 62 of the ski mounting assemblies 60 movably support the load-carrying bed 16 while vertical support members 48 of the axle assemblies 44 are adjustable for changing the height of the bed 16 above the ground.

The longitudinal rails 20 and transverse bars 22 of the load-carrying bed 16 and the front handle 24, angled side braces 28 and extension members 30 of the towing handle assembly 14 can be made of any suitable material which is lightweight and durable. An example of such material is aircraft aluminum. The horizontal spindles 46 and vertical support members 48 of the wheel or ski mounting assemblies 18, 60 can be made of any suitable material which has sufficient strength. An example of such material is steel.

Figure 10:
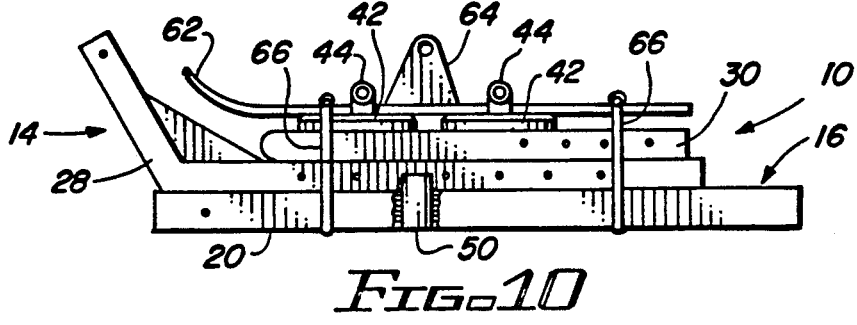
FIG. 10 is a side elevational view of the carrier disassembled and packed together for transport and storage during periods of non-use.

FIG. 10 illustrates the above-described parts of the mobile pull-type carrier 10 disassembled and packed together for transport and storage during periods of non-use. The parts can be retained in the stacked relationship by loops of flexible members 66, such as bungee cords or straps utilizing conventional hook and loop fastening materials.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A manual pull-type carrier, comprising:
   (a) a carriage including an elongated load-carrying bed and means for movably supporting said load-carrying bed above the ground to undergo movement across the ground; and
   (b) an adjustable towing handle assembly including a front handle and a structure interconnecting said handle to said load-carrying bed of said carriage and being adjustable relative to said front handle and said load-carrying bed for changing both the length and the height of said towing handle assembly relative to said load-carrying bed;
   (c) said interconnecting structure including
      (i) a pair of angled side braces adjustably telescopably connected to a front end of said load-carrying bed for changing the overall length of said carrier to support animal carcasses of different lengths thereon, and
      (ii) a pair of extension members supporting said front handle and adjustably telescopably supported by said angled side braces for changing the overall height of said handle to fit hunters of different heights towing said carriage;
   (d) each of said angled side braces including
      (i) an elongated rear portion adjustably telescopably connected to said front end of said load-carrying bed, and
      (ii) an elongated front portion attached at a rear end to a forward end of said rear portion so as to extend at an angle forwardly and upwardly from said rear portion, said expansion member being adjustable telescopably mounted to front end of a corresponding one of aid front portion.

2. A manual pull-type carrier, comprising:
   (a) a carriage including an elongated load-carrying bed and a pair of wheel mounting assemblies connected to opposite sides of said load-carrying bed and being adjustable for changing the height of said load-carrying bed above the ground and for moving said carriage across the ground; and
   (b) an adjustable towing handle assembly including a front handle and a structure interconnecting said handle to said load-carrying bed of said carriage and being adjustable relative to said front handle and said load-carrying bed for changing both the length and the height of the towing handle assembly relative to said load-carrying bed;
   (c) said interconnecting structure including
      (i) a pair of angled side braces adjustably telescopably connected to said front end of said load-carrying bed for changing the overall length of said carrier to support animal carcasses of different lengths thereon, and
      (ii) a pair of extension members supporting said fronthandle and adjustably telescopably supported by said angled side braces for changing the overall height of said handle to fit hunters of different heights towing said carriage;
   (d) each of said angled side braces including
      (i) an elongated rear portion adjustably telescopably connected to said front end of said load-carrying bed, and
      (ii) an elongated front portion attached at a rear end to a forward end of said rear portion so as to extend at an angle forwardly and upwardly from said rear portion, said extension member being adjustable telescopably mounted to the front end of a corresponding one of said front portions.

3. The carrier of claim 2 wherein each of said adjustable wheel mounting assembly includes a wheel and an axle assembly rotatably mounting said wheel and attached to a side of said load-carrying bed.

4. The carrier of claim 3 wherein said axle assembly includes a horizontal spindle rotatably mounting said wheel and a vertical support member rigidly attached to an end of said spindle and mounted to a side of said bed for vertical sliding movement relative thereto such that said wheels of said wheel mounting assemblies movably support aid bed while said vertical support members of said axle assemblies are adjustable for changing the height of said bed above the ground.

5. The carrier of claim 2 wherein said load-carrying bed includes a pair of longitudinal rails and a plurality of longitudinally spaced transverse bars extending between, rigidly interconnecting and laterally spacing said longitudinal rails.

6. The carrier of claim 5 wherein each of said adjustable wheel mounting assembly includes a wheel and an axle assembly secured to a side of one of said rails.

7. The carrier of claim 6 wherein said axle assembly includes a horizontal spindle rotatably mounting said wheel and a vertical support member rigidly attached to an end of said spindle and mounted to a side of one of said longitudinal rails of said bed for vertical sliding movement relative thereto such that said wheels of said wheel mounting assemblies movably support said bed while said vertical support members of said axle assemblies are adjustable for changing the height of aid bed above the ground.

8. A manual pull-type carrier, comprising:
   (a) a carriage including a elongated load-carrying bed and a pair of ski mounting assemblies connected to opposite sides of said load-carrying bed and being adjustable for changing the height of said load-carrying bed above the ground and sliding said carriage across the ground; and
   (b) an adjustable towing handle assembly including a front handle and a structure interconnecting said handle to said load-carrying bed of said carriage and being adjustable relative to said front handle and said load-carrying bed for changing both the length and the height of the towing handle assembly relative to said load-carrying bed;
   (c) said interconnecting structure including
      (i) a pair of angled side braces adjustably telescopably connected to a front end of said load-carrying bed for changing the overall length of said carrier to support animal carcasses of different lengths thereon, and
      (ii) a pair of extension members supporting said front handle and adjustably telescopably supported by said angled side braces for changing the overall height of said handle to fit hunters of different heights towing said carriage;
(e) each of said angled side braces including
  (i) an elongated rear portion adjustably telescopably connected to said front end of said load-carrying bed, and
  (ii) an elongated front portion attached at a rear end to a forward end of said rear portion so as to extend at an angle forwardly and upwardly from said rear portion, said extension member being adjustable telescopably mounted to the front end of a corresponding one of said front portions.

9. The carrier of claim 8 wherein each of said adjustable ski mounting assemblies includes an elongated ski, a mounting bracket, and an axle assembly, each axle assembly having a horizontal spindle pivotally mounting said ski and a vertical support member rigidly attached to an end of said spindle and mounted to said one of said opposite sides of said bed for vertical sliding movement relative thereto such that said skis of said ski mounting assemblies movably support said bed while said vertical support members of the axle assemblies are adjustable for changing the height of said bed above the ground.

10. The carrier of claim 8 wherein said load-carrying bed includes a pair of longitudinal rails and a plurality of longitudinally spaced transverse bars extending between, rigidly interconnecting and laterally spacing said longitudinal rails.

11. The carrier of claim 10 wherein each of said adjustable ski mounting assemblies includes an elongated ski, a mounting bracket, and an axle assembly, each axle assembly having a horizontal spindle pivotally mounting said ski and a vertical support member rigidly attached to an end of said spindle and mounted to a side of one of said longitudinal rails of said bed for vertical sliding movement relative thereto such that said skis of said ski mounting assemblies movably support said bed while said vertical support members of the axle assemblies are adjustable for changing the height of said bed above the ground.

* * * * *